United States Patent [19]

Saiki

[11] Patent Number: 4,804,221
[45] Date of Patent: Feb. 14, 1989

[54] VARIABLE SEAT FOR MOTORCYCLES

[75] Inventor: Terunari Saiki, Tokyo, Japan

[73] Assignee: Honda Giken Kogyo Kabushiki Kaisha, Tokyo, Japan

[21] Appl. No.: 189,992

[22] Filed: May 4, 1988

Related U.S. Application Data

[63] Continuation of Ser. No. 015,171, Feb. 17, 1987.

[30] Foreign Application Priority Data

Feb. 17, 1986 [JP] Japan .................................. 61-32113

[51] Int. Cl.⁴ ............................................... B62J 1/00
[52] U.S. Cl. ..................................... 297/195; 297/284; 297/243; 297/464
[58] Field of Search ............... 297/214, 284, 243, 195, 297/464

[56] References Cited

U.S. PATENT DOCUMENTS

| | | | |
|---|---|---|---|
| 4,452,485 | 6/1984 | Schuster | 297/284 |
| 4,462,634 | 7/1984 | Hanagan | 297/243 |
| 4,500,136 | 2/1985 | Murphy et al. | 297/284 |
| 4,536,030 | 8/1985 | Sakurada et al. | 297/284 |
| 4,537,444 | 8/1985 | Maruyama et al. | 297/284 |
| 4,636,000 | 1/1987 | Nishino | 297/284 |

Primary Examiner—Francis K. Zugel
Attorney, Agent, or Firm—Bucknam and Archer

[57] ABSTRACT

The present invention relates to a motorcycle seat including a single seat or a double seat provided with a side support portion in each of both right and left sides which is adjustably constructed the distance between an operator's or a passenger's waist sides and the side support portions. It can easily adjust the supporting pressure to their waist sides and therefore, such an arrangement can realize any suitable space adjustment to accommodate the difference from the operator's or the passenger's size.

8 Claims, 6 Drawing Sheets

VARIABLE SEAT FOR MOTORCYCLES

CROSS-REFERENCE TO RELATED APPLICATION

This application is a continuation of pending application Ser. No. 15,171 filed Feb. 17, 1987.

FIELD OF THE INVENTION

The present invention relates to a motorcycle seat including both a single seat and a double seat, particularly to a motorcycle seat provided with a pair of right and left movable support portions which are adjustably widen or shrunk the distance between an operator's or a passenger's waist sides and a portion of supporting the waist sides, and the operation or the passenger can select a comfortable position by adjusting the supportion pressure to their waist, which term means the zone from the waist to the hip in the present invention.

DESCRIPTION OF THE PRIOR ART

In a motorcycle seat, particularly a seat for such a motorcycle as being relaxedly riden, usually called an Amerian type motorcycle, there may be provided a back rest supporting a waist and a back an operator or a passenger and a side support portion to restrict the operator's or the passenger's tilting to the right and left direction which can be constituted by curving both the sides of the back rest to the operator's or the passenger's waist sides.

Furthermore, the side support portions would be an important device for a comfortable ride because a different pressure is loaded to the operator's the passenger's waist during a straight road running and a cornering running.

However, as the side support portions are rigidly and integrally constituted with the seat in the above-mentioned prior art, it can not provide for any adjustment to accommodate the size of the operator because of the great disparity in sizes between individuals who operate motorcycles.

DESCRIPTION OF THE INVENTION

It is an object of the present invention to provide a motorcycle seat provided with adjustable side support portions in both right and left sides of the seat and to adjustably widen and shrink the space between the operator's or the passenger's waist and the side support portions, and to be able to adjust the supporting pressure to the operator's or the passenger's waist so that the operator or the passenger can select a comfortable and convenient position for operating the motorcycle. There may be provided a pair of side support portions in both right and left sides of the motorcycle seat in order to support the operator's or the passenger's waist sides, each of which have a center frame movably mounted on a seat frame and an adjusting means which controls the movement of the center frame. When it would be required a wide supporting space for a big sized operator to sit on or a sitting operator wants to weaken the supporting pressure to him, with the control of the adjusting means a pair of right and left side supporting portions would be moved respectively to both the outside directions by rotation, slide and so on, then it results in providing the reasonable wider space for big sized operator by widening both the side supporting portions and also weakening the supportion pressure to the operator's waist side. Conversely speaking, when it would be necessary to prepare a narrow supporting space for a small sized operator or an passenger who wants to increase the supporting pressure to his waist side, with some control of the center frame movement by the adjusting means, both the side support portions should be respectively moved to the seat center direction. It can result in providing a reasonable narrow supporting space for the small sized operator or passenger increasing the supporting pressure to the operator's or the passenger's waist side. Consequently it can support almost of the different sized operator's or passenger's waist side under the best condition so that it can give the operator or the passenger the comfortable feeling.

BRIEF DESCRIPTION OF DRAWINGS

FIG. 1 is a view of a seat. FIG. 2 is a side view. FIG. 3 is a cross sectional view taken on line III—III of FIG. 2. FIG. 5 is a partially sectional side view. FIG. 6 is a cross sectional side view taken on line VI—VI of FIG. 5.

PREFERRED EMBODIMENTS

Figure 1:
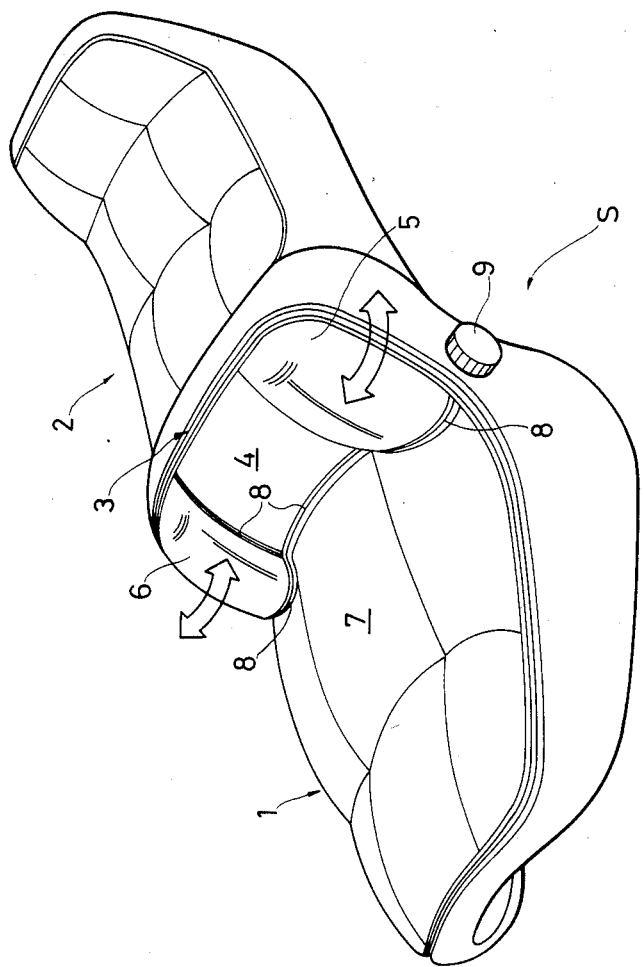
FIG. 1 to FIG. 3 shows a first preferred embodiment.
Figure 2:
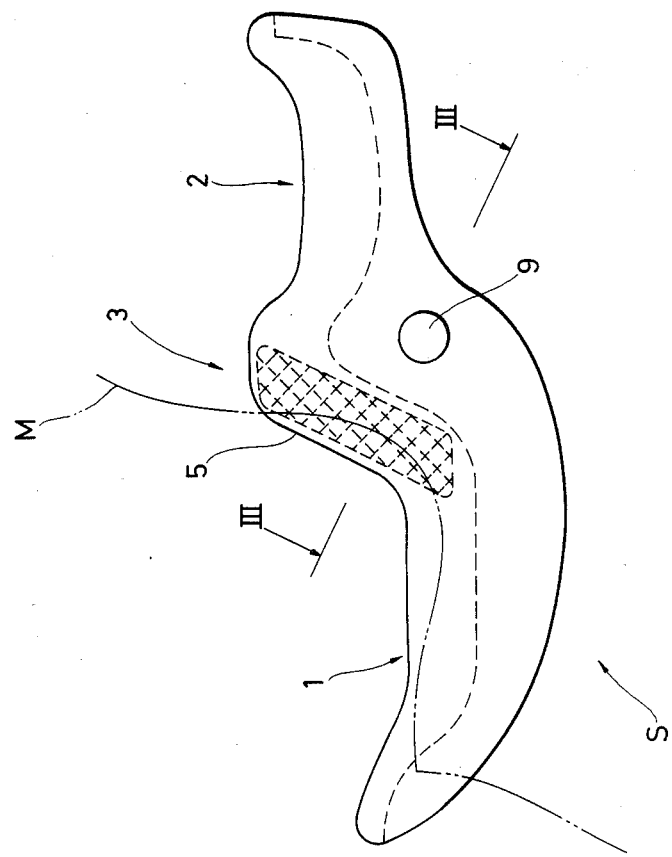
Figure 3:
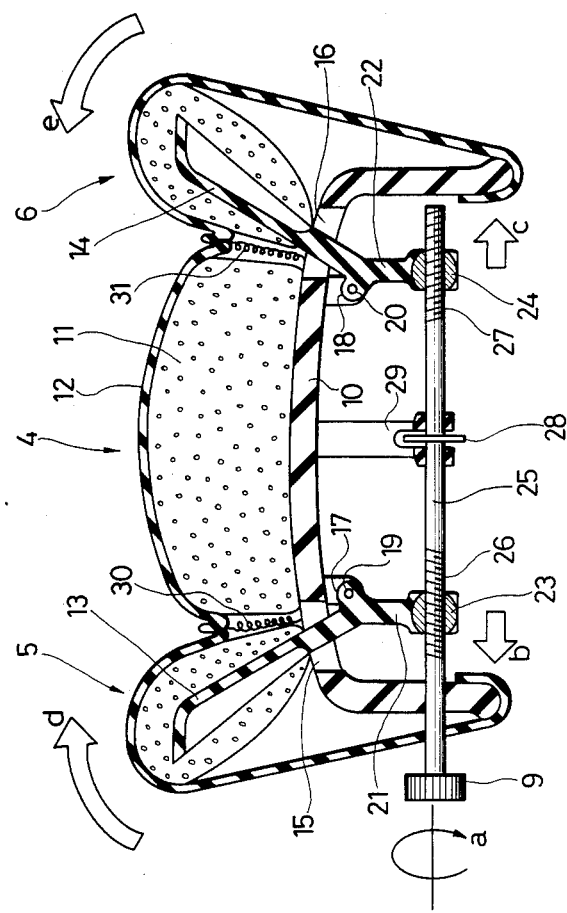

FIG. 1 to FIG. 3, FIG. 4 and FIG. 5 to FIG. 6 show respectively a first preferred embodiment, a second preferred embodiment and a third preferred embodiment. All of these embodiments show that the present invention may be adapted to the front seat of a motorcycle double seat. At first, a first embodiment will be described according to FIG. 1 to FIG. 3. A double seat S for a motorcyle is composed of a front seat 1 and a rear seat 2. At the rear end of the front seat 1 there is provided a basket portion 3 which is built up and separate from the rear seat front end. The basket portion 3 is formed to support an operator's waist, which is consisted of a back rest 4 to support the back of his waist and a pair of right and left side support portions 5, 6 to support both his waist sides which are continuously made from the back rest 4 to both sides and curved inwardly to his waist sides. As being clear from the dotted line of the operator shown in FIG. 2, side support portions 5, 6 are positioned to support only the operator's waist and not to prevent from his legs action. As shown in FIG. 1 the side support portions 5, 6 are possibly adjusted to the directions shown with white arrows, that is, to adjust widening to right and left directions with plain view of seat S so that it can adjust to widen and shrink the distance between the operator's waist and each of side support portions 5, 6. The surface skins at the joint portion among the side support portions 5, 6, the back rest portion 4 and the front seat surface 7 are formed to be elastic like bellows so that it could be easy to rotate the side support portions 5, 6. A knab 9 is provided at the side of the front seat 1 near the side support portion 5 and can actuate the adjusting mechanism arranged in the side support portions 5, 6 which will be described herein after. FIG. 3 shows the mechanical construction inside the side support portion. On a seat frame 10 shown a cross sectional figure, there is put a cushion 11 which may be made of polyurethane form and integrally pre-casting with the identical form with the basket 3 and then it may be covered with a surface skin 12 which may be made polyvinyl chloride. As it is used integrally formed cushion 11 and surface skin 12 which are continuously covered to the side support portions 5, 6, during widening of the side support portions 5, 6 the outside view of the seat S could maintain to be beautiful without any clearance there between.

A pair of right and left wing plate 13, 14 are disposed within the cushion element 11, which are one of center frame embodiment of the side support portions 5, 6 and the movable elements. The lower portions of these wing plates 13, 14 are passing through holes 15, 16 opened at both sides of the seat frame 10 and projecting to the back side of the seat 10. The lower portions have a pair of fitting portions which are pivoted to fitting portions of the seat frame 10 by the shafts 19, 20. At each of tip portions 21, 22 there are provided sliders 23, 24 with the nut portion therein. There could be various kind of fitting method of the sliders 23, 24 to the tip portions 21, 22. An operating shaft 25 is laterally disposed and connected with both right and left screws 26, 27 to the sliders 23, 24, which screws 26, 27 are formed on the operating shaft and have the opposite screw directions each other. A ring shaped stopper 28 is fastened on the center portion of the operating shaft 25 and disposed in the tip slot of the supporting portion 29 projected from the back center of the seat frame 10. One end of the operating shaft 25 is passing through the seat time 10 to be projected to the seat side and the knob 9 is fastened on the operating shaft tip. Therefore, rotating the knob 9 will bring the straight movement of the sliders 23, 24 along the operating shaft 25 and will be finally transferred into the rotating movement of the wing plates 13, 14 about the shafts 19, 20. The operating shaft 25 may be projecting from both right and left seat sides and supporting thereon, it can be struck off the stopper 28 and so on. If the knob would be provided at both seat sides, the operator can be adjusted by either right or left hand according to his mind. In the next stage the function of embodiment will be described. In FIG. 3 when the knob 9 is rotated to the direction indicated with arrow a (clockwise direction), each of the sliders 23, 24 moves respectively to the direction indicated with arrows b and c, that is, moves in the opposite direction each other, and then each of the wing plates 13, 14 rotates respectively to the directions indicated with arrows d and e, about the shaft 19, 20, that is, come close each other, so that the distance between the operator and the side support portions 5, 6 could be shrunk. Consequently it can increase the supporting pressure to the operator's waist on realize the narrow space suitable to an small sized operator. By rotating operation of the knob 9 to the opposite direction to the above, the side support portions 5, 6 rotate apart each other and then it can weaken the supporting pressure to the operator's waist or provide an comparatively wide supporting space suitable to a big sized operator.

Figure 4:
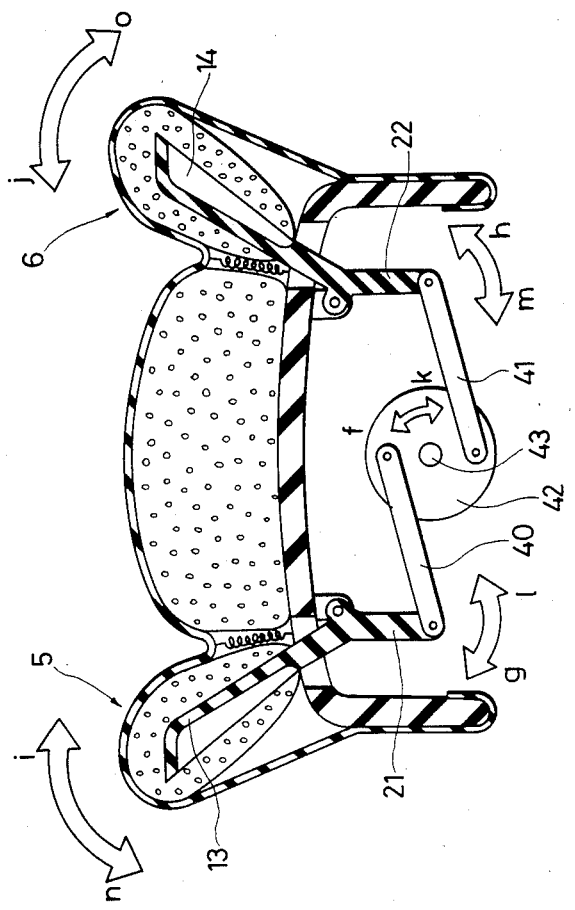
FIG. 4 is a sectional side view of a second preferred embodiment.

FIG. 4 shows a second preferred embodiment. The same elements as them in the first preferred embodiment will be described with the same symbols. The difference of this embodiment from the above first one is only an adjusting mechanism. Each end of the connecting arms 40, 41 is pivoted respectively to the fitting ends 21, 22 of the wing plates 13, 14. Each of other end of the connecting arms 40, 41 is pivoted to the circle plate 42. The pivoting points are disposed in symmetry with the rotating shaft 43. Rotating the shaft 43 in clockwise or in counter clock wise can adjust the distance between the side support portions 5, 6 to be wide or narrow as the last preferred embodiment. In case the circle plate 42 would be rotated to the rotation indicated with arrow f, the tip portions 21, 22 will be rotated to the direction with arrows g, h and then the wing plates 13, 14 will be rotated to the direction indicated with arrows i, j. It can result in decreasing the distance between the operator and the side support portions 5, 6 to increase the supporting pressure to the operator's waist side. In a meanwhile, in case the circle plate 42 would be rotated to the direction indicated with arrow k, the tip portions 21, 22 will be rotated to the direction with arrows l, m and then the wing plates 13, 14 will be rotated to the direction indicated with arrows n, o, so that it can bring to widen the distance between the operator and the side supporting portions and to make the supporting pressure to the operator weak. The circle plate 42 can be alternated to the link arm with the pivoted center portion.

Figure 5:
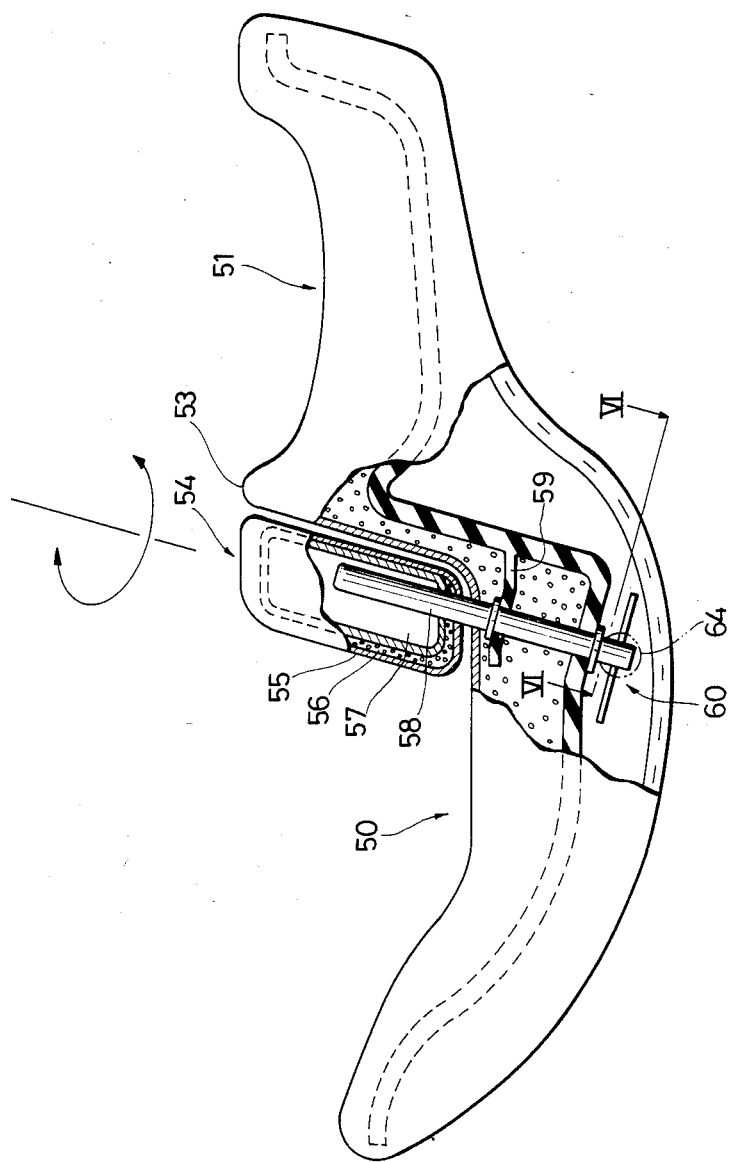
FIG. 5 and FIG. 6 show a third preferred embodiment.
Figure 6:
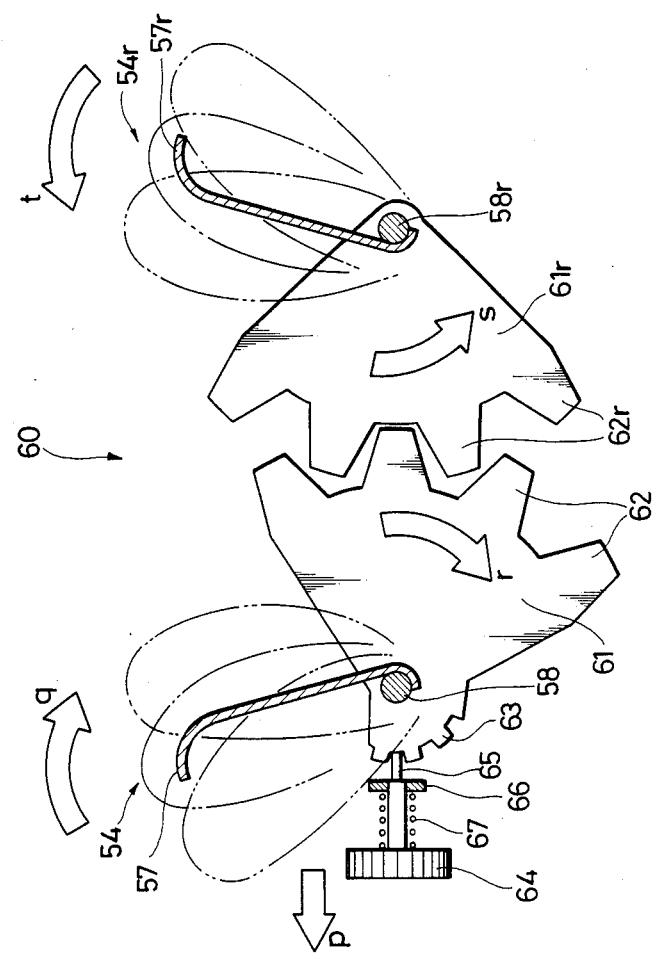

Further, FIG. 5 and FIG. 6 show a third preferred embodiment. There are provided a pair of the separated side support portions independent from the back rest 53 at both sides of it which is lifted up between the front seat 50 and the rear seat 51 of a double seat. As in the opposite right side of the seat (not shown in the drawing) there is provided another side support portion in symmetry with the left one, the right elements will be described with the simboles which the letter "r" will be added to the left element symbols. The side support portion 54 is made by covering the cushion element 56 and the wing plate 57 with the surface skin 55, and the wing plate 57 is fixed to one end portion of the rotating shaft 58. The other tip portion of the rotating shaft 58 is inserted into the inside of the front seat side and is rotatably pivoted on the seat frame 59 and its tip of the rotating shaft 58 is passing through the bottom portion of seat frame 59 and projecting to the back of the seat. At the end of the projecting portion there is provided an adjusting mechanism 60 for the rotation of the side support portion 54. FIG. 6 shows the detailed construction of the adjusting mechanism 60. On the rotating shaft 58, 58r there are respectively fastened the fan shaped tooth elements 61, 61r which rotate in the plain in right angle with the axle of the above-mentioned 61, 61r have a plurality of teeth 62, 62r on their tip which mesh with each other at the center between the right and left rotating shafts 58, 58r. A small sized fan shaped tooth 63 is integrally formed in the opposite side of the fan shaped element 61 and a lock element 65 with a knob 64 is engaged therewith. The lock element 65 is supported by the fitting element 66 integrally made with the seat frame (not shown in the drawing) and a spring 67 is disposed between the knob 64 and the fitting element 66. Function will be described in the following. In FIG. 6 when the knob 64 will be pulled against the spring 67 to the direction indicated arrow P, the lock element 65 will be released from the fan shaped tooth 63 and the fan shaped tooth element 61 will be able to be rotated about the shaft 58. When the side support portion 54 will be rotated to the direction with arrow q, the fan shaped tooth element 61 fixed on the shaft 58 will be rotated to the direction indicated with arrow r. As the tooth 62 is meshing the tooth 62r of the fan shaped tooth element 61r, the fan shaped tooth element 61r will be rotated to the direction indicated with arrow s and the opposite right side support portion 54r will be rotated to the direction with arrow t. Consequently, the right and left side support portions 54, 54r will become close each other to make the distance between both supporting points to the operator narrow. Under the reasonable distance condition rotation of the side support portion 54 will be stopped the knob 64 will be released so that the lock element 65 will be engaged with the fan shaped tooth 63 by return force of the spring 67. Rotation of the fan shaped tooth elements 61, 61r will be possibly locked. Conversely in case widening the distance between the supporting points of the side support portions 54, 54r, after releasing the lock between the lock element 65 and the fan shaped tooth 63, the side support portion will be rotated in the reverse direction. According to this embodiment, dead space under the frame will be effectively made use of putting the adjusting mechanism therein. As a different embodiment, each of both right and left side support portions will be slided in a straight line by screw mechanism in spite of rotation of the side support portions so that the supporting pressure or the supporting space will be possibly adjusted. The present invention is not limited to the above embodiments and will be possible to be adapted to many kinds of variations. For example, the adjusting means of the side support portions will be not only the mechanical system, but the electrical motor system and the pressurized oil system.

What is claimed is:

1. An arrangement for adjustably supporting the waist of a motorcycle operator, comprising:
    (A) an elongated double seat structure extending along a longitudinal direction from a front saddle seat for a motorcycle operator to a rear saddle seat for a motorcycle passenger,
        (i) said front saddle seat having a seating portion on which the operator sits astride with legs on opposite sides of the seating portion, a rear portion against which only the back of the waist of the operator is supported, and a pair of side waist bolster portions against which only opposite sides of the waist of the operator are supported at opposite sides of the seating portion, said bolster portions being spaced apart in a direction transverse to the longitudinal direction by a transverse distance,
        (ii) said rear saddle seat being connected to the front saddle seat and having a seating section on which the passenger sits astride with legs on opposite sides of the seating section, said seat section having a transverse width less than said transverse distance between the bolster portions;
    (B) an elongated seat frame extending longitudinally from a front support portion on which the front saddle seat is supported at a predetermined elevation, to a rear support portion on which the rear saddle seat is supported at an elevation above said predetermined elevation; and
    (C) means for adjusting said transverse direction between the bolster portions, including
        (i) a pair of rigid members, each located within a respective bolster portion, said rigid members being mounted on the seat frame for simultaneous movement toward each other to a first waist-supporting condition in which said transverse distance is decreased, and for simultaneous movement away from each other to a second waistsupporting condition in which said transverse distance is increased,
        (ii) a manually-operated element mounted on the double seat structure between the front and rear saddle seats at substantially the same horizontal level of the front seat surface and below the horizontal level of the rear seat surface, and
        (iii) a transmission mounted within the seat structure, and operatively connected between the element and the rigid members, for enabling the rigid members and the bolster portions to be moved between said waist-supporting conditions.

2. The arrangement as recited in claim 1, wherein each rigid member is pivotably mounted on the frame for movement about an inclined pivot axis.

3. The arrangement as recited in claim 2, wherein the manually-operated element is a manually-turnable actuator, and wherein each rigid member includes a plate mounted within a respective bolster portion and extending through an opening in the frame, and an arm integral with the plate.

4. The arrangement as recited in claim 3, wherein each arm carries an interiorly threaded nut, and wherein the transmission includes an elongated drive shaft having the actuator at one end thereof, said drive shaft having a pair of exteriorly threaded portions threadedly engaging each nut, said exteriorly threaded portions having threads of opposite pitch, and wherein the transmission further includes means on the drive shaft for preventing axial movement of the drive shaft relative to the frame.

5. The arrangement as recited in claim 3, wherein the transmission includes a wheel operatively connected to the actuator for reciprocating movement about a wheel axis, and a pair of elongated links having first ends pivotably connected on the wheel at opposite sides of the wheel axis, and second ends pivotably connected to the arms.

6. The arrangement as recited in claim 2, wherein each rigid member includes a plate mounted within a respective bolster portion, and an elongated rod on which the plate is fixedly mounted, and wherein the transmission includes a pair of meshing sector gears, each fixedly mounted on a respective rod for reciprocating movement therewith about a respective rod axis extending lengthwise of a respective rod.

7. The arrangement as recited in claim 6, wherein the manually-operated element is a manually-pullable release member mounted for movement between a normally locked position in which the release member lockingly engages one of the sector gears, and a release position in which the release member is disengaged from said one sector gear.

8. The arrangement as recited in claim 1, wherein the front and rear saddle seats are padded and covered with an outer covering which extends over the seating, rear and bolster portions of said front saddle seat.

* * * * *